United States Patent [19]
Jackson

[11] Patent Number: 6,094,194
[45] Date of Patent: Jul. 25, 2000

[54] APPARATUS AND METHOD OF PROVIDING A CONTROLLER FOR SELECTIVE BLOCKING OF CABLE TELEVISION PROGRAMMING

[76] Inventor: Joseph N. Jackson, 13621 Cerise Ave., No. 1, Hawthorne, Calif. 90250

[21] Appl. No.: 08/951,361

[22] Filed: Oct. 16, 1997

[51] Int. Cl.$^7$ ...................................................... H04N 7/10
[52] U.S. Cl. ................ 345/327; 348/5.5; 348/10
[58] Field of Search .......................... 345/327; 348/5.5, 348/6, 7, 10, 12; 455/5.1, 5.2; H04N 5/445

[56] References Cited

U.S. PATENT DOCUMENTS

| | | |
|---|---|---|
| 4,425,579 | 1/1984 | Merrell . |
| 4,718,107 | 1/1988 | Hayes . |
| 4,768,229 | 8/1988 | Benjamin et al. . |
| 5,001,554 | 3/1991 | Johnson et al. . |
| 5,051,837 | 9/1991 | McJunkin . |
| 5,155,591 | 10/1992 | Wachob ................................ 348/5.5 |
| 5,168,372 | 12/1992 | Sweetser . |
| 5,250,767 | 10/1993 | Sammon . |
| 5,382,983 | 1/1995 | Kwoh et al. . |
| 5,465,113 | 11/1995 | Gilboy . |
| 5,548,345 | 8/1996 | Brian et al. . |
| 5,949,471 | 9/1999 | Yuen et al. ............................... 348/5.5 |

*Primary Examiner*—Nathan Flynn
*Attorney, Agent, or Firm*—Blakely, Sokoloff, Taylor & Zafman LLP

[57] ABSTRACT

The present invention is a controller for selectively blocking cable television programming provided by a cable converter that is contained within the controller. The cable converter downconverts an input signal and provides one or more channels as an output to a viewing screen. The controller includes an input unit that transmits at least one command and a transmitter that transmits at least one remote control signal to the cable converter. The controller further includes a processor coupled to the input unit and the transmitter. The processor is adapted to block viewing of at least one selected channel when configured to operate in a first state. The processor controls the transmitter to transmit the at least one remote control signal to the cable converter to change from a first channel to a second channel in response to said at least one command from said input unit when said processor is configured to operate in a second state.

17 Claims, 4 Drawing Sheets

APPARATUS AND METHOD OF PROVIDING A CONTROLLER FOR SELECTIVE BLOCKING OF CABLE TELEVISION PROGRAMMING

BACKGROUND OF THE INVENTION

1. Field of the Invention

The present invention relates generally to cable television controllers and particularly to a cable television controller that is compatible with an existing cable converter for selectively blocking cable television programming.

2. Description of Related Art

It is becoming increasingly important to control the viewing of television and video programs by children on an ongoing basis, especially at times when personal supervision cannot be provided. Ideally, there should be agreed-upon ground rules regarding the channels that can be watched; the time of viewing such as specific days or hours of the day; and the total viewing time that is permitted per day, per week, or per month. Even with such agreement, effective management and enforcement becomes a formidable task for working parents.

In addition, while many television programs that are educational and/or suitable for children and/or youths are offered by cable channels, such as the Discovery Channel, Arts and Entertainment Channel, and the Disney Channel, there are an equal, if not greater, number of television programs that are not suitable for children. Such unsuitable programs include the Playboy Channel, certain adult Pay-per-view channels, and the like. With an increasing demand for programs offered by cable channels and thousands of cable companies providing cable service in the United States, such unsuitable cable channel programs have become increasingly accessible to children and youths.

One example of a parental control television system is disclosed in U.S. Pat. No. 5,548,345 to Brian et al. The '345 patent discloses a TV/video viewing supervision system that enables a supervisor to selectively pre-program the hours, programs, and/or channels of television for viewing. The '345 patent provides the user with the option of either blocking selected channels/time periods or allowing selected channels/time periods for viewing. Although the '345 patent may be implemented by antenna-based systems, it is not readily adaptable to cable-based systems. That is, the supervision system of the '345 patent is not compatible with a standard stand-alone cable box. Thus, in order to block one or more channels of a standard cable box, the supervision system of the '345 patent must be integrated within the standard cable box. This may be undesirable and impracticable because there are a vast number of different cable boxes being used by cable companies.

Therefore, there is a need in the art for a cable controller that is compatible with a vast number of existing cable converters for selectively blocking cable television programming without any modification to the cable converter hardware.

SUMMARY OF THE INVENTION

The present invention is a controller for selectively blocking cable television programming provided by a cable converter that is contained within the controller. The cable converter downconverts an input signal and provides one or more channels as an output to a viewing screen. The controller includes an input unit that transmits at least one command and a transmitter that transmits at least one remote control signal to the cable converter. The controller further includes a processor coupled to the input unit and the transmitter. The processor is adapted to block viewing of at least one selected channel when configured to operate in a first state. The processor controls the transmitter to transmit the at least one remote control signal to the cable converter to change from a first channel to a second channel in response to said at least one command from said input unit when said processor is configured to operate in a second state.

BRIEF DESCRIPTION OF THE DRAWINGS

The features and advantages of the present invention will become apparent from the following detailed description of the present invention in which.

DESCRIPTION OF THE PREFERRED EMBODIMENT

Figure 1:
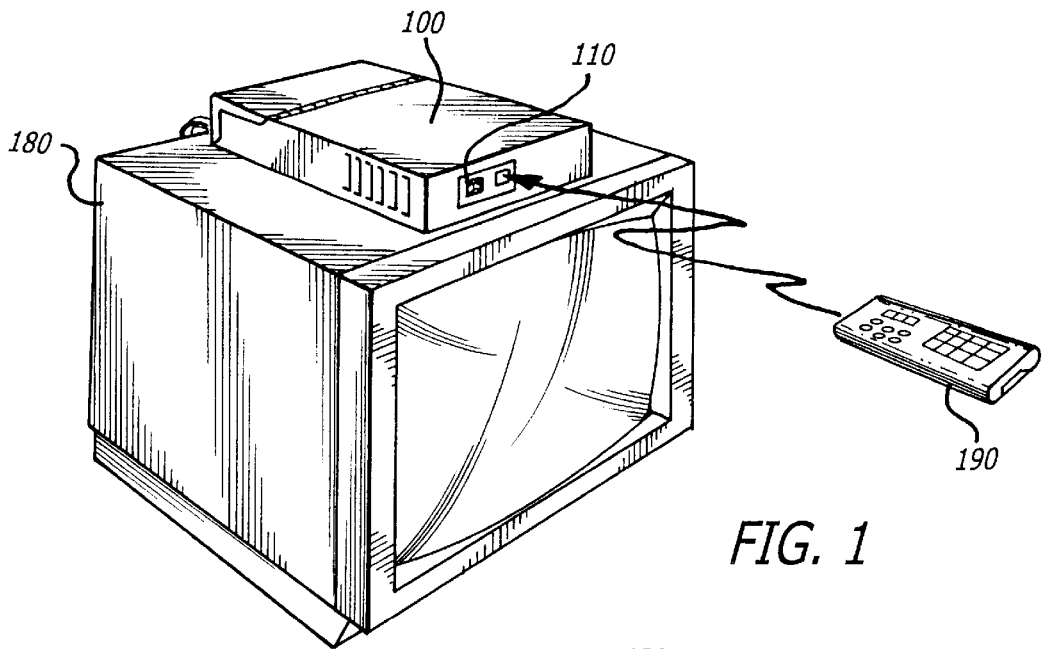
FIG. 1 illustrates a perspective view of a television, a remote controller, and a cable controller of the present invention.

The present invention is a cable controller for selectively blocking cable television programming. FIG. 1 illustrates a perspective view of one embodiment of the present invention. As shown, the cable controller 100 is coupled to a television set 180 for controlling the viewing of television programming. Cable controller 100 includes a manual control keypad 110, preferably located on the front face of the cable controller 100, for operating the cable controller 100. In one embodiment, a remote controller 190 is provided for remotely operating the cable controller 100. In an alternate embodiment, a VCR (not shown) is coupled between the cable controller 100 and the television 180 for recording and playback of selected programming. A more detailed description of the cable controller 100 will be provided in the following sections.

Figure 2:
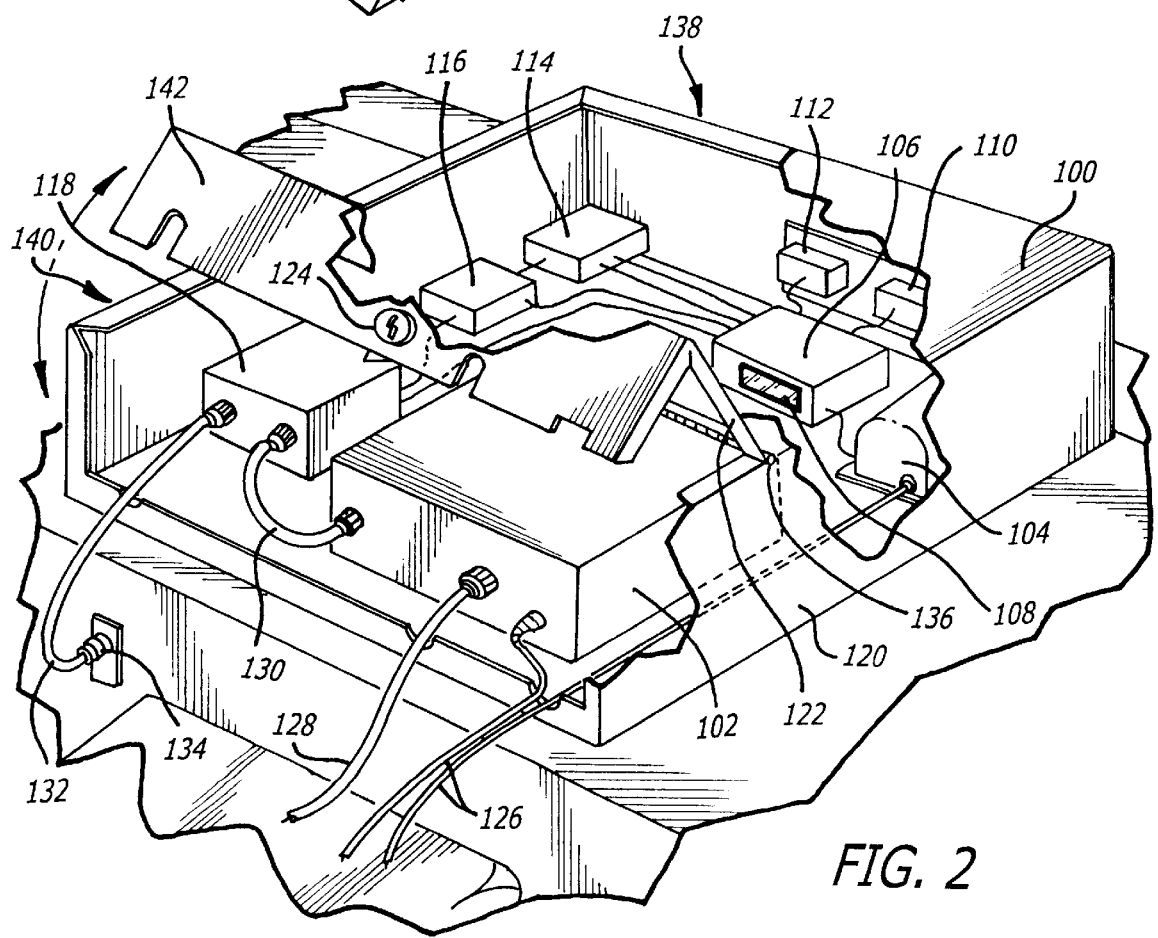
FIG. 2 illustrates a perspective view of the cable controller of the present invention.

FIG. 2 illustrates a perspective view of one embodiment of the cable controller 100 of the present invention. Referring to FIG. 2, cable controller 100 includes a cable box 102, a power supply 104, a microprocessor-based controller circuitry (hereinafter referred to as "processor circuitry") 106, a manual control keypad 110, an infra-red ("IR") receiver 112, a video generator/driver 114, a channel modulator 116, and a video switch 118, all of which are contained within a housing 120. In the embodiment of FIG. 2, the processor circuitry 106 includes an IR transmitter (not shown) having an IR window 108 that transmits an IR light beam to control operation of the cable box 102. In an alternative embodiment, the IR transmitter is external and coupled to the processor circuitry 106. In either embodiment, the IR window 108 is positioned relative to the cable box 102 such that the IR transmitter can transmit an IR light beam directly to an IR receiver (not shown) in the cable box 102. Cable box 102 is a standard cable box, typically rented from a cable company, for de-scrambling cable channels.

Continuing to refer to FIG. 2, a lid 122 is pivotally connected to the housing 120 by means of a hinge 136. In a first or closed position, the lid encloses the housing 120 and secures the cable controller 100 to prevent unauthorized access. In a second or open position, the lid 122 allows access to the cable controller 100. In addition, a lock 124 is provided on the lid 122 so as to securely enclose the input and output connections of the cable controller 100. In this manner, unauthorized persons (e.g., a child) may be prevented from tampering with the cable controller 100 and/or altering the cable connection (i.e., conductor 130) so as to bypass the switch 118.

AC cables 126 provide power to the cable box 102 and the cable controller 100. Cable box 102 receives all of the signals including audio and video sent from the cable company via conductor 128. The conductor 128 is typically a coaxial cable. The output of the cable box 102 is coupled to the video switch 118 via conductor 130. The video switch 118 provides an output of the cable converter 100 via conductor 132 that selects between the cable box 102 output and the video generator/driver 114 output. Conductor 132 couples the cable controller 100 to the television 180 at a connector 134. Alternatively, the output of the cable controller 100 is coupled to the input of a VCR and the output of the VCR is coupled to the television 180 at the connector 134.

The housing 120 is preferably made of high impact plastic and comprises a front compartment 138 and a rear compartment 140. The electronics are typically housed in the front compartment 138 of the housing 120 while the rear compartment 140 of the housing 120 is hollow and has sufficient room for the cable box 102 to be located and secured. The rear compartment 140 is opaque to outside IR signals. This prevents the cable box 102 from being separately operated (i.e., by its own remote control) and/or the processor circuitry 106 from being bypassed. The back panel 142 is installed with security screws requiring a special tool for removal. If the back panel 142 is disturbed, the cable controller 100 ceases to operate and controls the video generator/driver 114 and video switch 118 to generate a message on the television screen such as "UNAUTHORIZED TAMPERING. ENTER SECURITY CODE TO RESET". The cable controller 100 will not return to normal operation until the security code is entered, even if power is removed from the power supply.

Figure 3:
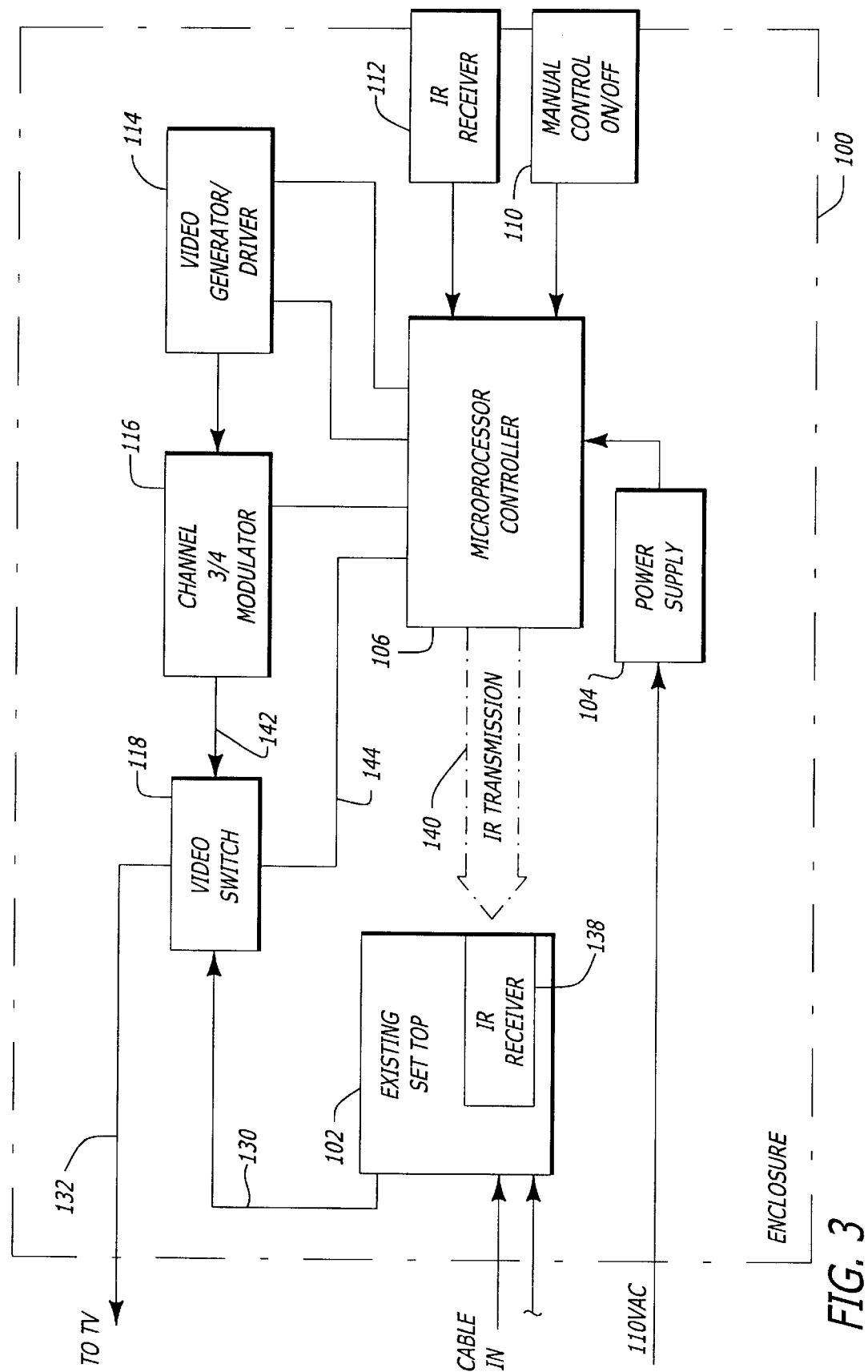
FIG. 3 illustrates a block diagram of the cable controller of the present invention.

FIG. 3 illustrates a block diagram of the cable controller 100 of the present invention. Referring to FIG. 3, the processor circuitry 106 controls the cable box 102 by way of an IR transmitter (not shown), the video generator/driver 114, the channel modulator 116, and the video switch 118. Cable controller 100 further includes memory such as random access memory ("RAM") and/or read only memory ("ROM") for storing programming information, graphical screens, and the like. In the embodiment of FIG. 3, the RAM and/or ROM is contained within the processor circuitry 106. However, it is contemplated that the RAM and/or ROM may be located outside of the processor circuitry 106. The cable controller 100 receives commands by way of the manual control keypad 110 and/or the remote controller 190. The IR receiver 112 detects IR commands emitted from the remote controller 190 and transmits the commands to the processor circuitry 106. Typical commands include turning the cable controller 100 on and off, changing channels, controlling the volume, and programming of the cable controller 100.

Continuing to refer to FIG. 3, video generator/driver 114, which is typically an integrated circuit chip, is controlled by processor circuitry 106 to generate various graphical screens having setup, informational, and menu (e.g., FIG. 5) messages. Processor circuitry 106 retrieves the appropriate message under software control, and transmits the message to the video generator/driver 114 for display on the graphical screen. The messages and graphics information are stored in memory (e.g., RAM, ROM, etc.). The video generator/driver 114 then transmits the graphical screens to the channel modulator 116. The channel modulator 116 modulates the graphical screens up to a selected channel. The selected channel is typically channel 3 or 4 depending on which is an inactive broadcast channel in the area. The television is also tuned to the selected channel. The output of the channel modulator 116 is coupled to the video switch 118 which is controlled by the processor circuitry 106. Thus, if graphical screens are to be displayed, the processor circuitry 106 controls the video switch 118 to allow the channel modulator output 142 to be displayed on the display screen (i.e., television).

To facilitate the use of the cable controller 100 with an existing cable box remote control, the cable controller 100 may be programmed to receive and process commands issued by an existing cable box remote control. This is accomplished by first pressing a learn key on the manual control keypad 110 to initiate a learning mode within the processor circuitry 106. Once initiated, the processor circuitry 106 causes the video generator/driver 114 to generate various graphical screens to be displayed on the display screen, each of which facilitates control and/or adjustment of settings. In one embodiment, the processor circuitry 106 prompts the user to press various keys corresponding to settings/commands such as channel up/down, volume up/down, mute, on/off power, etc., in sequence on the cable box remote control (not shown) so that the processor circuitry 106 can learn the commands (referred to as viewing commands).

In addition to learning the viewing commands above, the processor circuitry 106 is capable of learning specific cable box commands (e.g., buy, options, scroll, guide, etc.). As is known by one of ordinary skill in the art, the particular commands provided on a cable box from a particular cable company may be different than provided by another company. This feature allows a user to utilize the full capabilities of the cable box service provided by any cable company. Once the commands have been learned, the processor circuitry 106 can detect the commands and control the IR transmitter to transmit the same commands (when allowed to do so) to the cable box 102 by way of IR light beam 140.

In another embodiment, a generic remote control is programmed and used with the cable controller 100 rather than the cable box remote control. The generic remote control (not shown) may be programmed to learn all of the cable box viewing commands such as channel up/down, volume up/down, mute, on/off, time set, etc. The generic remote control may further include a number of auxiliary control buttons (not shown) which can be programmed to duplicate the infrared signal commands that are specific to a brand name cable box. Some examples of these commands include: the "Buy" (to purchase a program), the "Options/Scroll" (to select and scroll through cable menus), and the "Guide" (to select cable system program guide) commands. Since many cable boxes have distinctive remote control commands that control the functions of the cable service rather than the viewing content (e.g., channel command), the auxiliary control buttons of the generic remote control can be programmed to transmit such commands to allow full capabilities of the cable box service. However, the specific cable box commands may be inhibited (e.g., by a parent) if so desired.

It is to be further noted that the present invention may be used in conjunction with circuitry for implementing the V-chip technology. This allows a user to further restrict the viewing of television programming.

Power supply 104 provides the voltage and current requirements of the cable controller 100. In one embodiment, the power supply receives 110 volts from a wall output unit. The Power supply 104 outputs various levels of AC voltages for use by the components within the cable controller 100. Power supply 104 also contains a battery for preserving the programming information (e.g., blocked channels) in RAM when power is removed from the cable controller 100. In an alternate embodiment, the programming information may be stored in nonvolatile random access memory ("NVRAM"), thus eliminating the need for a battery.

The cable controller 100 is programmable to limit viewing in a number of different ways. In particular, television viewing can be limited by blocking out one or more channels, blocking out one or more blocks of time, and/or limiting the number of hours that television is watched over a period of time (e.g., a week). The cable controller 100 may also be programmed to turn on a specific channel at a specific time so that a television program will not be missed. In addition, the cable controller 100 can be programmed to turn off or remain turned off for a specified time period. For instance, cable controller 100 can be programmed to turn off at 10:00 PM on a selected number of days. If the cable controller 100 is turned on during the "off" period, a message such as "TELEVISION VIEWING/ACCESS PROHIBITED AT THIS TIME" is displayed.

In one embodiment, in addition to the learning mode described above, the cable controller 100 provides three operational modes, namely, a normal viewing mode, a supervised viewing mode, and a programming mode. While in the normal viewing mode, the cable controller 100 allows full control of the cable box 102 for unlimited access and viewing. In the supervised viewing mode, the cable controller 100 only permits viewing during the selected times, on the selected channels, and for the duration that is programmed by a parent or user. The parent or user can block viewing of a particular channel, a set of channels, a block of time for a particular channel, or when viewing is limited by a specified number of hours per time period (e.g., 20 hours/week).

In order to enter the programming mode, the user must enter an access code by way of either the manual control keypad 110 or the remote controller 190. Once in the programming mode, the user can program the cable controller 100 to limit viewing in any one of the number of ways discussed above. In addition, while in the programming mode, channels that have been "blocked" may be viewed by a parent or a user, thus allowing unlimited access to the parent or user having the access code. If the cable controller 100 is turned off while in the programming mode and viewing is not restricted in any way (i.e., no channels are blocked), then the cable controller 100 will be in the normal viewing mode when it is turned back on. Alternatively, if the cable controller 100 is turned off while in the programming mode and viewing is restricted (i.e., a channel is blocked), then the cable controller 100 will be in the supervised viewing mode when it is turned back on.

While operating in the normal viewing mode, a user transmits a channel change command to the cable controller 100 either via manual control keypad 110 or remote controller 190 to change to a selected channel. Processor circuitry 106 receives the channel change command from either the manual control keypad 110 or the IR receiver 112 and controls the IR transmitter (not shown) to transmits an IR light beam 140 to the IR receiver 138 of the cable box 102 to change the channel. In addition, the processor circuitry 106 drives a signal on signal line 144 to a first state which causes the video switch 118 to couple the cable box output 130 to the video switch output 132, thereby displaying the selected channel programming on the display screen.

While operating in the supervised viewing mode, a user transmits a channel change command to the cable controller 100 to change to a selected channel. Processor circuitry 106 detects the command and determines whether the selected channel is blocked. For example, the processor circuitry 106 compares the selected channel to a list of "blocked" channels in memory (e.g., RAM, NVRAM, etc.). If the selected channel is not blocked, the processor circuitry 106 performs the same operations as in the normal viewing mode. However, if the selected channel is blocked, the processor circuitry 106 does not transmit an IR light beam to the cable box 102. Rather, the processor circuitry 106 controls the video generator/driver 114 to generate a graphical screen having a message such as "THIS CHANNEL IS BLOCKED". The graphical screen is provided by the video generator/driver 114 to the channel modulator 116 for modulation to channel 3 or 4. In addition, the processor circuitry 106 drives the signal on the signal line 144 to a second state which causes the video switch 118 to couple the channel modulator output 142 to the video switch output 132.

Figure 4:
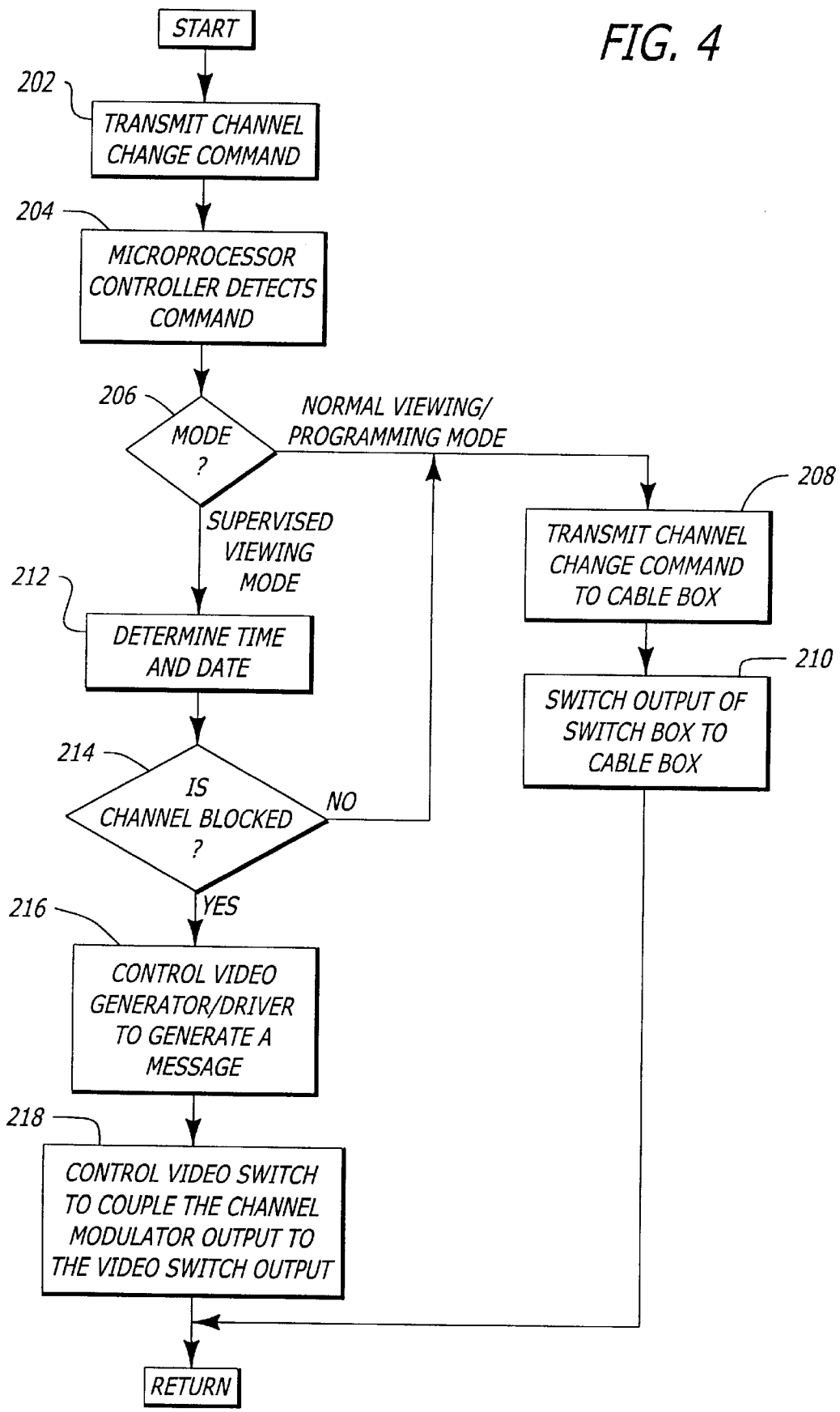
FIG. 4 is a flow diagram illustrating the general process steps provided in accordance with the present invention.

FIG. 4 is a flow diagram illustrating the general process steps followed by the present invention. The process commences at step 202 where a channel change command is transmitted by way of either the manual control keypad 110 or the remote controller 190. The channel change command is transmitted when, for example, a user presses a channel up or down key, a particular channel, or a last channel key. At step 204, the processor circuitry 106 detects the channel change command either by way of manual control keypad 110 or IR receiver 112. At step 206, the processor circuitry 106 determines the mode that it has been configured to operate. If the processor circuitry 106 is the normal viewing mode or the programming mode, the process proceeds to step 208. At step 208, the processor circuitry 106 causes the IR transmitter to transmit an IR light beam 140 to the IR receiver 138 in the cable box 102 to change the channel. For example, if a channel up command is transmitted to the processor circuitry 106, then a channel up command is transmitted to the cable box 102. At step 210, the processor circuitry 106 controls the video switch 118 to couple the cable box output 130 to the video switch output 132. The process then terminates.

Continuing to refer to FIG. 4, if the processor circuitry is in the supervised viewing mode at step 206, the process proceeds to step 212. At step 212, the processor circuitry 106 determines the current time and date. At step 214, a determination is made as to whether the selected channel is blocked at the current time and date. If the channel is not blocked, then the process proceeds to step 208 to change the channel. If the channel is blocked, the process proceeds to step 216 where the processor circuitry 106 controls the video generator/driver 114 to generate a message such as "THIS CHANNEL IS BLOCKED". At step 218, the processor circuitry 106 controls the video switch 118 to coupled the channel modulator output 142 to the video switch output 132. The process then terminates.

Figure 5:
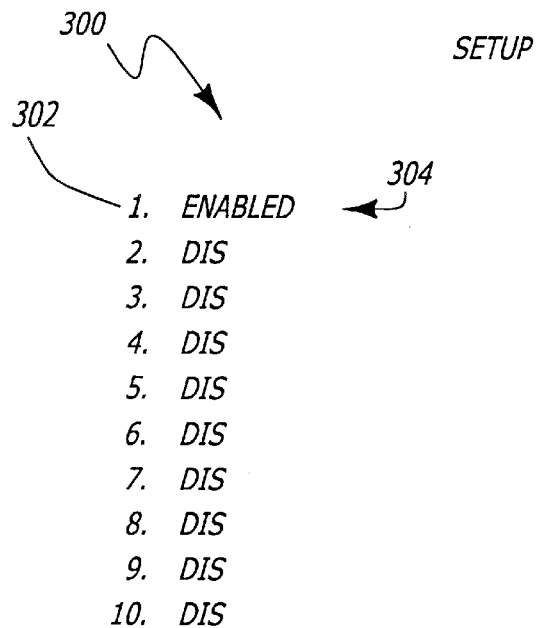
FIG. 5 illustrates an exemplary setup display screen in connection with the present invention.

FIG. 5 illustrates an exemplary setup display screen in connection with the present invention. Referring to FIG. 5, the setup display screen 300 includes a program selection number 302. In the embodiment of FIG. 5, ten program selection numbers are shown, although a greater or fewer program selection numbers may be used. Next to the program selection number 302 is a status field 304 which identifies whether that particular program selection number has been programmed. With the remote controller 190 or the manual control keypad 110, a user can scroll through (e.g., using the up/down keys) and select one (e.g., by pressing enter) of the program selection numbers or press the program selection number followed by <enter> in order to enter the program menu screen for that particular program selection number.

Figure 6:
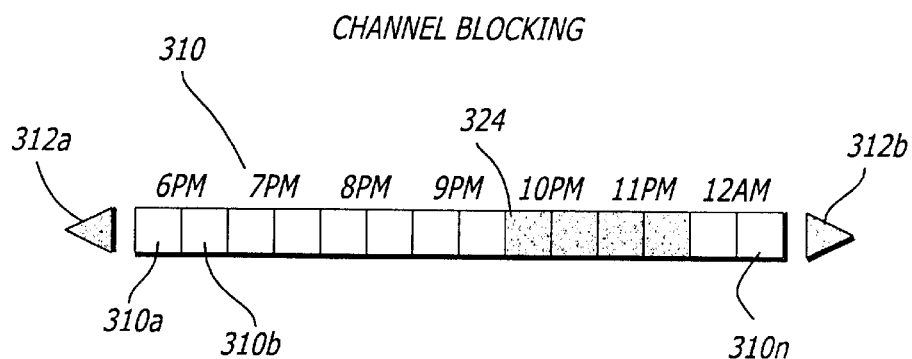
FIG. 6 illustrates a program menu screen used in connection with the present invention.

FIG. 6 illustrates a program menu screen used in connection with the present invention. Referring to FIG. 6, a one dimensional time matrix 310 is shown in half-hour increments. Using the manual control keypad 110 or the remote controller 190, a user can highlight one or more blocks 324 in the time matrix 310, each of which represents a half-hour increment in time. Arrows 312 allow the matrix 310 to be shifted to display a different time range. A program selection field 314 shows the program selection number. A channel field 316 shows the one or more channels that are to be selected for this particular program. A date field 318 shows the starting date for blocking one or more channels. A frequency field 320 shows the frequency for blocking the one or more channels (i.e., once, daily, weekly, etc.). A preference field 322 allows the user to choose between blocking one or more channels, turning on to a particular channel, or turning off the cable controller 100 at a particular time (e.g., at 10:00 PM every night, after 20 hours of viewing in one week, etc.).

In one embodiment, the cable controller 100 includes an IR transmitter (not shown) in order to control a VCR connected to the cable controller 100. The IR transmitter may be placed near the manual control keypad 110 or any other place. If a direct IR signal path from the cable controller 100 to the VCR cannot be established, the IR transmitter may be positioned in such a way so as to bounce the IR signal off a wall towards the VCR. Moreover, the cable controller 100 is capable of learning the IR signal commands of the VCR remote control so that it can replicate the VCR remote control. By way of example, if a particular television program is to be recorded, the cable controller 100 may be programmed (e.g., by providing an option in the program menu screen of FIG. 6) to transmit an IR signal to the VCR (e.g., record, pause, stop record, etc.). This feature allows the cable controller 100 to control the VCR so that the VCR does not have to be setup separately.

Implementation of the present invention facilitates the use of an existing cable box (e.g., one rented from a cable company) for selectively blocking viewing of cable channels. Moreover, the present invention is extremely flexible because it can be interfaced with a vast number of different cable boxes without any modification of the cable box hardware.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A controller for selectively blocking cable television programming provided by a cable converter contained within the controller, the cable converter downconverts an input signal and provides one or more channels as an output to a viewing screen, the controller comprising:

an input unit that transmits at least one command;

a transmitter that transmits at lease one remote control signal to the cable converter;

a processor coupled to said input unit and said transmitter, said processor adapted to block viewing of at least one selected channel when configured to operate in a first state, said processor controls said transmitter to transmit the at least one remote control signal to the cable converter to change from a first channel to a second channel in response to said at least one command from said input unit when said processor is configured to operate in a second state.

2. The controller of claim 1 wherein said first state is a supervised viewing mode.

3. The controller of claim 1 wherein said second state is a normal viewing mode.

4. The controller of claim 1 further comprising:

a video generator/driver controlled by said processor that generates and transmits a graphical screen having a message;

a modulator coupled to said video generator/driver for modulating said graphical screen to a predetermined channel; and a switch having a first input coupled to said modulator, a second input coupled to the cable converter, and a switch output coupled to the viewing screen, said switch being controlled by said processor to select a first output of said cable converter to be displayed on the viewing screen if said channel is not blocked and alternatively to select a second output of said modulator to be displayed on the viewing screen if said channel is blocked.

5. The controller of claim 1 wherein said transmitter, said processor, and the cable converter are contained within a housing.

6. The controller of claim 5 wherein said housing comprises a lid that is pivotally coupled to said housing, said lid being moveable from a first position to a second position, wherein in said first position, said controller is secured within said housing, and wherein in said second position, said controller within said housing is exposed and accessible.

7. The controller of claim 1 wherein said input unit is a remote controller.

8. The controller of claim 1 further comprising a memory that stores a valve corresponding to a blocked channel.

9. The controller of claim 1 wherein said input unit is configured to transmit commands to said processor to block viewing of at least one channel during at least one predetermined time periods.

10. The controller of claim 1 wherein said at least one remote control signal operates in an infrared frequency range.

11. A system for selectively blocking cable television programming on a viewing screen, comprising:

a housing;

a lid that is pivotally coupled to said housing;

a cable converter located within said housing that descrambles an input signal and provides at least one channel as an output to the viewing screen, said cable converter responsive to at least one remote control signal;

a transmitter unit located within said housing that transmits at least one remote control signal to said cable converter;

an input unit that transmits at least one command; and a processor coupled to said transmitter unit, said processor adapted to block viewing of at least one selected channel when configured to operate in a first state, said processor controls said transmitter unit to transmit the at least one remote control signal to said cable converter to change from a first channel to a second channel in response to said at least one command from said input unit when said processor is configured to operate in a second state;

wherein said lid is moveable from a first position to a second position, wherein in said first position, said controller within said housing is secured, and wherein in said second position, said controller within said housing is accessible.

12. The controller of claim 11 wherein said first state is a supervised viewing mode.

13. The controller of claim 11, wherein said second state is a normal viewing mode.

14. The controller of claim 11 further comprising:

a video generator/driver controlled by said processor for generating and transmitting a message;

a modulator coupled to said video generator/driver for modulating said message to a predetermined channel; and a switch having a first input coupled to said modulator, a second input coupled to said cable converter, and a switch output coupled to the viewing screen, said switch controlled by said processor for selecting a first output of said cable converter to be displayed on the viewing screen if said channel is not blocked and alternatively for selecting a second output of said modulator to be displayed on the viewing screen if said channel is blocked.

15. The controller of claim 11 wherein said input unit is a remote controller.

16. The controller of claim 11 wherein said input unit is a manual keypad.

17. The controller of claim 11 further comprising a memory that stores a value corresponding to a blocked channel.

* * * * *